(12) United States Patent
Kayser et al.

(10) Patent No.: US 6,295,212 B1
(45) Date of Patent: Sep. 25, 2001

(54) SWITCHING POWER SUPPLY WITH STORAGE CAPACITANCE AND POWER REGULATION

(75) Inventors: Kenneth W. Kayser; Kalman Zsamboky, both of Roanoke, VA (US); Robert A. Shaufl, Pickerington, OH (US)

(73) Assignee: Bias Power Technology, Inc., Palatine, IL (US)

( * ) Notice: Subject to any disclaimer, the term of this patent is extended or adjusted under 35 U.S.C. 154(b) by 0 days.

(21) Appl. No.: 09/487,646

(22) Filed: Jan. 19, 2000

(51) Int. Cl.[7] .................................................. H02M 3/335
(52) U.S. Cl. ................................................................ 363/19
(58) Field of Search ................................. 363/190, 18, 40

(56) References Cited

U.S. PATENT DOCUMENTS

| | | | |
|---|---|---|---|
| 4,017,782 | * 4/1977 | Wheeler | 363/19 |
| 4,486,821 | * 12/1984 | Itakura | 363/18 |
| 4,956,760 | 9/1990 | Gulczynski | 363/16 |
| 5,155,430 | 10/1992 | Gulczynski | 323/224 |
| 5,331,534 | 7/1994 | Suzuki et al. | 363/20 |
| 5,790,390 | * 8/1998 | Kayser | 363/20 |
| 5,834,882 | 11/1998 | Bishop | 310/359 |
| 5,889,660 | * 3/1999 | Taranowski et al. | 363/19 |

OTHER PUBLICATIONS

"Design Idea DI–3 TOPSwitch® Burst Mode Flyback" Power® Integrations, Inc. (two pages), Jun. 1998, source: www.powerint.com. No Author.

"Design Idea DI–1 TOPSwitch® Buck Converter" Power® Integrations, Inc. (two pages), Jun. 1998, source: www.powerint.com. No Author.

"TNY253/254/255 TinySwitch™ Family Energy Efficient, Low Power Off–line Switchers" Power® Integrations, Inc. (16 pages), Feb. 1999. No Author.

"TinySwitch™ Flyback Design Methodology Application Note AN–23" Power® Integrations, Inc. (10 pages), Jul. 1999. No Author.

"TNY256 TinySwitch™ Plus Engery Efficient, Low Power Off–line Switcher" Power® Integrations, Inc. (20 pages), Aug. 1999. No Author.

* cited by examiner

*Primary Examiner*—Shawn Riley
(74) *Attorney, Agent, or Firm*—Jenkens & Gilchrist

(57) ABSTRACT

A power supply system includes an a-c. power source and an off-line power supply for storing energy from the a-c. power source during first selected time intervals and converting at least a portion of the stored energy to a d-c. output during second selected time intervals. A diode or other switch disconnects the off-line power supply from the a-c. power source during the second selected time intervals to reduce conducted EMI. The first and second selected time intervals are preferably synchronized to the frequency of the a-c. power source.

32 Claims, 2 Drawing Sheets

US 6,295,212 B1

SWITCHING POWER SUPPLY WITH STORAGE CAPACITANCE AND POWER REGULATION

FIELD OF THE INVENTION

The present invention relates generally to power supply systems and, more particularly, to off-line power supplies for supplying a d-c. output from an a-c. power source. A particularly useful application for the present invention is in bias supplies and other cost-sensitive applications such as appliances using microprocessors.

SUMMARY OF THE INVENTION

U.S. Pat. No. 5,790,390 describes a power supply system that includes an a-c. power source and an off-line power supply for storing energy from the a-c. power source during first selected time intervals and converting at least a portion of the stored energy to a d-c. output during second selected time intervals. A diode or other switch disconnects the off-line power supply from the a-c. power source during the second selected time intervals to reduce conducted EMI. The first and second selected time intervals are preferably synchronized to the frequency of the a-c. power source.

It is a primary object of the present invention to provide an improved off-line power supply of the general type described in the aforementioned patent but having improved efficiency.

Another important object of this invention is to provide an improved off-line isolated power supply which provides constant d-c. output power over a wide a-c. input voltage and temperature range.

It is yet another object of this invention to provide such an improved off-line power supply which is extremely reliable in operation, and can be made with a rugged construction.

Other objects and advantages of the invention will be apparent from the following detailed description and the accompanying drawings. In accordance with the present invention, the foregoing objectives are realized by providing a power supply system comprising an a-c. power source; an off-line power supply for storing energy from the a-c. power source during first selected time intervals and converting at least a portion of the stored energy to a d-c. output during second selected time intervals; means for disconnecting the off-line power supply from the a-c. power source during the second selected time intervals to reduce conducted EMI; and power-regulation means for preventing variations in the first and second selected time intervals due to a-c. input voltage and temperature variations. In the preferred embodiment of the invention, the power-regulation means is effective at operating a-c. input voltages ranging from 85 to 265 and temperatures ranging from below zero degrees C. to above 75 degrees C.

The off-line power supply of this invention preferably includes switching means for controlling the first and second selected time intervals, and energy-conserving means for storing energy for triggering the switching means during the second selected time intervals so as to avoid continuous power consumption during those intervals.

DETAILED DESCRIPTION OF PREFERRED EMBODIMENTS

Figure 1:
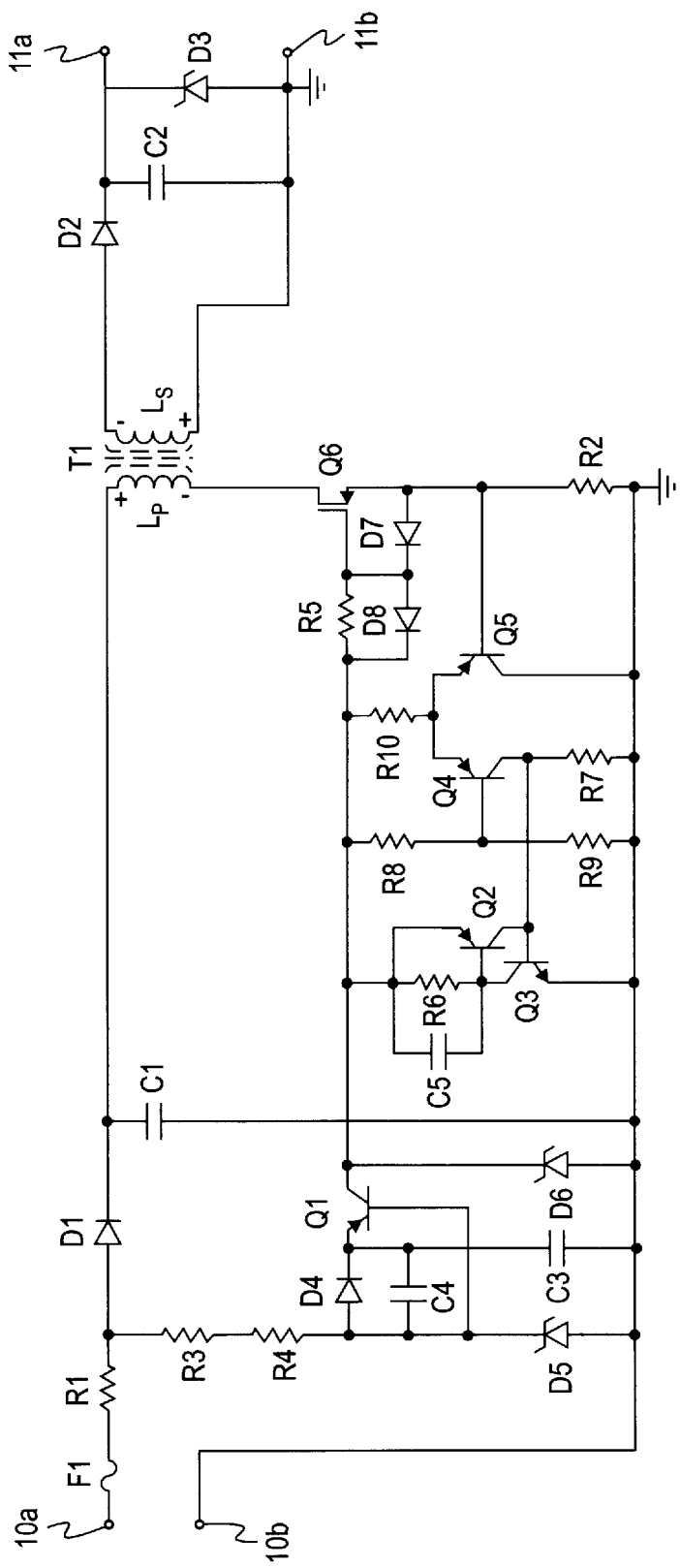
FIG. 1 is a schematic diagram of a bias-supply system embodying the invention.

While the invention is susceptible to various modifications and alternative forms, specific embodiments thereof have been shown by way of example in the drawings and will be described in detail herein. It should be understood, however, that it is not intended to limit the invention to the particular forms disclosed, but, on the contrary, the intention is to cover all modifications, equivalents and alternatives falling within the scope of the invention defined by the appended claims.

Turning now to the drawings, FIG. 1 illustrates a bias supply system for receiving a-c. power from an external source connected to a pair of input terminals 10a and 10b and supplying a regulated d-c. output at a pair of output terminals 11a and 11b. The a-c. signal from one input terminal is applied through a fuse F1 and a resistor R1 to the anode of a diode D1 which functions as a half-wave rectifier to pass only the positive half cycles of the a-c. input. The resistor R1 functions as a current-limiting resistor to limit the in-rush of energy from the input terminals when the diode D1 is conducting.

From the diode D1, the rectified power input is passed to a storage capacitor C1 to store the incoming energy. The capacitor C1 is charged during each positive half cycle of the a-c. input, and is periodically discharged during the time intervals when D1 is not conducting. This effectively disconnects the supply from the a-c. input line during the power transfer to the output. When the capacitor C1 discharges, the stored energy flows through the primary winding $L_p$ of a transformer T1 connected in series with a FET Q6. The FET is controlled by a control circuit (described below) which controls the transfer of power to the d-c. output by turning the FET on and off.

The diode D1 functions as a disconnect switch to disconnect the off-line power supply from the a-c. power source while the C1 energy is being transferred to the output, which is when most of the conductive EMI is generated. Consequently, most of the conductive EMI generated by the off-line power supply is confined to the power supply itself, and cannot interfere with other circuits or devices. As will be apparent from the following description, most of the switching and inductive changes that produce EMI in the off-line power supply occur during the power transfer while the diode is in its disconnect mode. If desired, an active switching device may be used in place of the diode D1, which functions as a passive switch.

Whenever the FET Q6 is turned on, current flows through the primary winding $L_p$ of the transformer T1 which stores energy as an inductor of inductance $L_p$. This current ramps up to a peak value, $I_{pk}$, which flows through a resistor R2 connected between the FET Q6 and common. $I_{pk}$ produces a voltage across the resistor R2 which causes the control circuit to turn off the FET Q6. With the FET Q6 off, the magnetic field built up in the primary winding of the transformer T1 collapses, and the energy present in the field is transferred to the secondary winding $L_s$ of the transformer T1. This produces an output current which flows through a diode D2 to the output terminal 11a and returning through terminal 11b. A capacitor C2 connected across the output terminals smoothes the output, and a zener diode D3 in parallel with the capacitor C2 regulates the output voltage. The diode D2 prevents conduction in the secondary winding of the transformer T1 while the capacitor C1 is discharging through the primary winding.

The illustrative bias-supply system provides a constant power output. The control circuit 10 turns off the FET Q6 when the voltage across the resistor R2 builds up to a preselected level representing a maximum current value $I_{pk}$ that is slightly below the level where the core of the transformer T1 starts saturating. That is, the value of $I_{pk}$ determines the power $E_{out}$ stored in the primary winding $L_p$, as can be seen from the following formula:

$$E_{out} = \tfrac{1}{2} L_p I_{pk}^2$$

where $L_p$ is the inductance of the primary winding of the transformer and $I_{pk}$ is the maximum current through the resistor R2.

The control circuit controls the FET Q6 to transfer energy from the capacitor C1 to the transformer T1 during a single time interval in each negative half cycle of the a-c. input. In this circuit, the voltage drop across a pair of resistors R3 and R4 determines when a transistor Q1 is turned off, which occurs during positive half cycles of the a-c. input when the base-emitter voltage Vbe of the transistor Q1 is positive. When the transistor Q1 is off, the FET Q6 and a pair of transistors Q2 and Q3 are held off while the capacitor C1 is charging. During the negative half cycle of the a-c. input, the transistor Q1 base-emitter voltage Vbe goes to negative, and Q1 turns on, which enables the FET Q6 to be turned on and the discharge of the capacitor C1.

The a-c. signal from one input terminal is applied through the resistors R3 and R4 to the anode of a diode D4 which, like the diode D1, functions as a half-wave rectifier to pass only the positive half cycles of the a-c. input. From the diode D4, the rectified power input is passed to a storage capacitor C3 to store the incoming energy. Like the capacitor C1, the capacitor C3 is charged during each positive half cycle of the a-c. input. A zener diode D5 limits the voltage across the capacitor C3 and normalizes the stored charge relatively independent of the a-c. input voltage. When the transistor Q1 turns on, the capacitor C3 discharges through the emitter-collector circuit of the transistor Q1 and a resistor R5 to the gate of the FET. This circuit provides the necessary voltage to turn on the FET Q6. The capacitor C3 and the zener D5 are selected so that the capacitor C3 stores only the amount of energy needed to turn on the FET Q6 for the time interval required to reach the Ipk value. This improves the efficiency of the circuit by reducing the power consumption of the circuit. A capacitor C4 connected across the diode D4 filters the noise from the a-c. input power source.

When the FET Q6 is on, current from the capacitor C1 ramps through the FET Q6 so as to convey energy to the primary winding of the transformer T1. The current ramp causes a transistor Q3 to turn on when the voltage across R2 builds up to the selected reference voltage Vref. When the transistor Q3 turns on, it turns on the transistor Q2. The transistors Q2 and Q3 form a latch which turns off the FET Q6 by pulling down the voltage at the gate connection of the FET Q6. This latch holds the FET Q6 off until the capacitor C3 is discharged and the supply current to the transistors Q2 and Q3 is depleted, thereby turning off the latch. Resistors R6 and R7 determine the current level at which the latch is turned off. A capacitor C5 is connected in parallel with the resistor R6 to reduce false triggering in the control circuit. When the FET Q6 turns off, the magnetic field built up in the primary winding of the transformer T1 collapses, and the energy in the primary winding transfers to the secondary winding.

A zener diode D6 has its cathode connected to the gate of the FET Q6 through R5 to prevent the voltage at the gate of Q6 from reaching a level which could damage Q6 or cause improper operation. At the gate of the FET Q6, a diode D7 is connected between the source and gate of the FET to protect against negative spikes, and another diode D8 is connected in parallel with the resistor R5 to cause the FET to turn off quickly when the voltage at the gate of the FET is reduced by the latch.

When the circuitry described thus far is used in applications involving a wide range of operating temperatures, the characteristics of the base-emitter junctions of the transistors Q2 and Q3 can vary with temperature, which in turn can change the time intervals during which the FET Q6 is on and off. Specifically, the voltage at which the transistor Q3 is turned on (the voltage across resistor R7) can vary with temperature. To avoid such variations in the time intervals, a low-power comparator including a pair of transistors Q4 and Q5 is connected to the gate and source of the FET Q6. This comparator has the effect of producing a sharp step voltage change across the resistor R7 so that the time at which the transistor Q3 is turned on is always substantially the same, regardless of changes in the specific voltage level required to turn on the transistor Q3 due to temperature changes.

The comparator includes a voltage divider formed by resistors R8 and R9, which sets the comparator reference voltage Vref. This voltage divider applies a portion of the FET Q6 turn-on voltage to the base of the transistor Q4, while the base of the second transistor Q5 receives the voltage from the FET side of the resistor R2. When the voltage across the resistor R2 builds up to equal the reference voltage Vref, the transistor Q5 turns off and the transistor Q4 turns on, directing the current, set by the resistor R10, to the resistor R7. The voltage developed across the resistor R7 subsequently turns on the latch and turns off the FET Q6. The base-emitter voltages of both transistors Q4 and Q5 are sensitive to temperature, so they both change when the temperature changes, thereby preventing any change in the time intervals during which the FET is on or off due to temperature changes.

Figure 2:
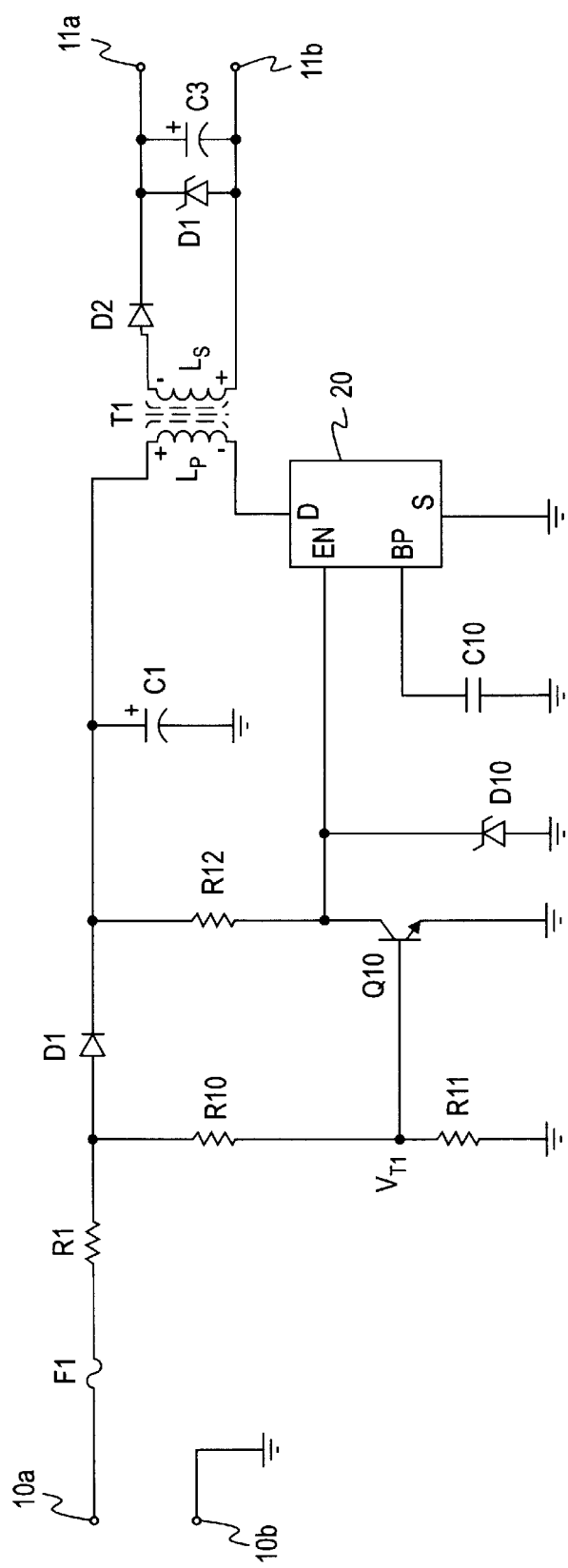
FIG. 2 is a schematic diagram of an alternative bias-supply system embodying the invention.

FIG. 2 illustrates a modified control circuit 10 for discharging the capacitor C1 in multiple time increments within each negative half cycle of the a-c. input, rather than in a single increment as in the circuit of FIG. 1. Discharging the capacitor C1 in multiple time increments permits the discharge intervals to be shorter, with less energy per pulse, which in turn permits the use of a smaller transformer. This can be a significant advantage in applications having relatively large power requirements, which can cause the required transformer to become large in size.

In the circuit of FIG. 2, as in FIG. 1, the a-c. signal from one input terminal 10a is applied through a fuse F1 and a resistor R1 to the anode of a diode D1 which functions as a half-wave rectifier to pass only the positive half cycles of the a-c. input. The resistor R1 functions as a current-limiting resistor to limit the in-rush of energy from the input terminals when the diode D1 is conducting. From the diode D1, the rectified power input is passed to a storage capacitor C1 to store the incoming energy. The capacitor C1 is charged during each positive half cycle of the a-c. input, and is periodically discharged during the time intervals when D1 is not conducting. This effectively disconnects the supply from the a-c. input line during the power transfer to the output. When the capacitor C1 discharges, the stored energy flows through the primary winding $L_p$ of the transformer T1 connected in series with an integrated circuit 20 containing a FET.

The integrated circuit 20 is an off-line switcher, such as the TNY253, 254 or 255 available from Power Integrations, Inc. of Sunnyvale, Calif. These integrated circuits include a high-voltage power MOSFET, an oscillator, a high-voltage switched current source, and current limit and thermal shutdown circuitry. The integrated circuit includes a drain pin D which is the drain connection to the MOSFET to provide internal operating current for both start-up and steady-state operation; a source pin S which is the source connection to the MOSFET; a bypass pin BP for connection to an external bypass capacitor C10 for an internally generated supply, and an enable pin EN which enables the MOSFET to be turned on when the pin is high and permits the switching of the MOSFET to be terminated by pulling the pin low. As long as the enable pin EN remains high, the internal oscillator turns the MOSFET on at the beginning of each cycle of the oscillator output. The MOSFET is then turned off when the current ramps up to the current limit, and then on again at the beginning of the next cycle of the oscillator output. This cycling of the MOSFET on and off continues until the enable pin EN is pulled low.

Returning to FIG. 2, the voltage level on the enable pin EN is controlled by a transistor Q10. A pair of resistors R10 and R11 form a voltage divider which determines when the transistor Q10 is turned on, which occurs when the voltage at the base of the transistor Q10 reaches a selected threshold voltage $V_{T1}$. When the transistor Q10 is on, the pin EN is pulled low to prevent switching of the MOSFET in the integrated circuit 20. When the voltage at the base of the transistor Q10 falls below the threshold voltage $V_{T1}$, the transistor Q10 turns off, which causes the voltage on the enable pin EN to go high so that the MOSFET can be turned on at the beginning of the next cycle of the oscillator output. A resistor R12 connected between the positive side of the capacitor C1 and the pin EN determines the voltage level on the pin EN when the transistor Q10 is off.

A zener diode D10 has its cathode connected to the enable input EN of the integrated circuit 20 to prevent the voltage at the input EN from reaching a level which could damage the FET or cause improper operation. A capacitor C10 is connected to ground from the BP terminal of the switching module 20 to reduce false triggering in that module.

While the invention has been described above with particular reference to the use of a fly-back power transfer system, it will be understood that other types of transfer systems may be used.

What is claimed is:

1. A power supply system comprising
    an a-c. power source,
    an off-line power supply including a capacitance for storing energy from said a-c. power source during first selected time intervals and converting at least a portion of the stored energy to a d-c. output during second selected time intervals,
    power switching means for disconnecting said off-line power supply from said a-c. power source during said second selected time intervals, at least said first selected time intervals being synchronized with said a-c. power source to ensure disconnection of said off-line power supply from said a-c. power source during said second selected time intervals during normal operation of said power supply system, and
    power-regulation means having a transformer with a primary winding, means for supplying current to said primary winding from said capacitance during said second selected time intervals, and means for interrupting the flow of current to said primary winding at a preselected peak current level and substantially independently of temperature.

2. The power supply system of claim 1 wherein said power regulation means includes a control switch for controlling said interrupting means in response to a voltage representing said preselected peak current level, the peak level of said voltage remaining substantially constant regardless of changes in said a-c. input voltage so that the energy transferred to said d-c. output remains substantially constant.

3. The power supply system of claim 1 wherein said power regulation means includes a second capacitance for storing the amount of energy needed to trigger said power switching means and to operate said control switch.

4. The power supply system of claim 1 wherein said first selected time intervals are at least portions of the positive half cycles of the input signal from said a-c. power source.

5. The power supply system of claim 1 wherein said second selected time intervals occur within the negative half cycles of the input signal from said a-c. power source.

6. The power supply system of claim 1 wherein said off-line power supply includes means for converting a substantially constant amount of said stored energy to said d-c. output in each of said second selected time intervals.

7. The power supply system of claim 1 wherein said off-line power supply includes a capacitor for storing said energy from said a-c. power source during said first selected time periods, and controllable switching means connected to said capacitor for controlling said second selected time intervals.

8. The power supply system of claim 7 wherein said controllable switching means is synchronized with the a-c. input signal from said a-c. power source.

9. The power supply system of claim 7 which includes control means for turning said switching means off during said first selected time intervals, and after the discharge of a selected amount of energy from said capacitor in each of said second selected time intervals.

10. The power supply system of claim 1 which includes means for converting at least a portion of the stored energy to said d-c. output in multiple second selected time intervals between each successive pair of said second selected time intervals.

11. The power supply system of claim 1 which includes means for storing said energy from said a-c. power source when the a-c. input signal from said source is above a predetermined threshold voltage, and means for converting stored energy to said d-c. output when said a-c. input signal is below said threshold voltage.

12. The power supply system of claim 1 wherein said off-line power supply includes a half-wave rectifier receiving the a-c. signal from said power source, and a storage capacitor receiving the output from said rectifier.

13. The power supply system of claim 1 wherein said off-line power supply includes means for maintaining a substantially constant transfer of said stored energy to said d-c. output during said second selected time intervals.

14. The power supply system of claim 1 wherein said off-line power supply includes a transformer for receiving said stored energy, and switching means for forming a path for transferring said stored energy to said transformer during said second selected time intervals.

15. The power supply system of claim 14 which includes means for forming a path for transferring said stored energy to said transformer during multiple time segments in each of said second selected time intervals.

16. A power supply system comprising
    an a-c. power source, and
    an off-line power supply including a capacitance for storing energy from said a-c. power source during first selected time intervals and converting at least a portion of the stored energy to a d-c. output during second selected time intervals, at least said first time intervals being synchronized to the frequency of said a-c. power source,
    power switching means for disconnecting said off-line power supply from said a-c. power source during said second selected time intervals, and power-regulation means having a transformer with a primary winding, means for supplying current to said primary winding from said capacitance during said second selected time intervals, and a control switch for interrupting the flow of current to said primary winding in response to a voltage representing a preselected peak current level, the peak level of said voltage remaining substantially constant regardless of changes in said a-c. input voltage so that the energy transferred to said d-c. output remains substantially constant, said power regulation means also including a second capacitance for storing the amount of energy needed to trigger said power switching means and to operate said control switch.

17. The power supply system of claim 16 wherein at least said first selected time intervals are synchronized with said a-c. power source.

18. The power supply system of claim 16 wherein said first and second selected time intervals are synchronized with said a-c. power source.

19. The power supply system of claim 16 wherein said first selected time intervals are at least portions of the positive half cycles of the input signal from said a-c. power source.

20. The power supply system of claim 16 wherein said second selected time intervals occur within the negative half cycles of the input signal from said a-c. power source.

21. The power supply system of claim 16 wherein said off-line power supply includes means for converting a substantially constant amount of said stored energy to said d-c. output in each of said second selected time intervals.

22. The power supply system of claim 16 wherein said off-line power supply includes a capacitor for storing said energy from said a-c. power source during said first selected time periods, and controllable switching means connected to said capacitor for controlling said second selected time intervals.

23. The power supply system of claim 22 wherein said controllable switching means is synchronized with the a-c. input signal from said a-c. power source.

24. The power supply system of claim 22 which includes control means for turning said switching means off during said first selected time intervals, and after the discharge of a selected amount of energy from said capacitor in each of said second selected time intervals.

25. The power supply system of claim 16 which includes means for converting at least a portion of the stored energy to said d-c. output in multiple second selected time intervals between each successive pair of said second selected time intervals.

26. The power supply system of claim 16 which includes means for storing said energy from said a-c. power source when the a-c. input signal from said source is above a predetermined threshold voltage, and means for converting stored energy to said d-c. output when said a-c. input signal is below said threshold voltage.

27. The power supply system of claim 16 wherein said off-line power supply includes a half-wave rectifier receiving the a-c. signal from said power source, and a storage capacitor receiving the output from said rectifier.

28. The power supply system of claim 16 wherein said off-line power supply includes means for maintaining a substantially constant transfer of said stored energy to said d-c. output during said second selected time intervals.

29. The power supply system of claim 16 wherein said off-line power supply includes a transformer for receiving said stored energy, and switching means for forming a path for transferring said stored energy to said transformer during said second selected time intervals.

30. The power supply system of claim 29 which includes means for forming a path for transferring said stored energy to said transformer during multiple time segments in each of said second selected time intervals.

31. A method of supplying standby d-c. power from an a-c. power source, said method comprising storing energy from said a-c. power source in a capacitance during first selected time intervals and converting at least a portion of the stored energy to a d-c. output during second selected time intervals, disconnecting said capacitance from said a-c. power source during said second selected time intervals, at least said first selected time intervals being synchronized with said a-c. power source to ensure disconnection of said capacitance from said a-c. power source during said second selected time intervals during normal operation of said power supply system, supplying current from said capacitance to the primary winding of a transformer during said second selected time intervals, interrupting the flow of current to said primary winding at a preselected peak current level and substantially independently of temperature.

32. A method of supplying standby d-c. power from an a-c. power source, said method comprising storing energy from said a-c. power source in a capacitance during first selected time intervals and converting at least a portion of the stored energy to a d-c. output during second selected time intervals by supplying current from the stored energy to the primary winding of a transformer, at least said first time intervals being synchronized to the frequency of said a-c. power source, disconnecting said off-line power supply from said a-c. power source during said second selected time intervals, supplying current from said capacitance to the primary winding of a transformer during said second selected time intervals, interrupting the flow of current to said primary winding in response to a voltage representing a preselected peak current level, the peak level of said voltage remaining substantially constant regardless of changes in said a-c. input voltage so that the energy transferred to said d-c. output remains substantially constant, and storing in a second capacitance the amount of energy needed to trigger said power switching means and to operate said control switch.

\* \* \* \* \*